US012661592B2

(12) United States Patent
Yokokawa

(10) Patent No.: US 12,661,592 B2
(45) Date of Patent: Jun. 23, 2026

(54) LIKE BUTTON

(71) Applicant: Sony Interactive Entertainment Inc., Tokyo (JP)

(72) Inventor: Yutaka Yokokawa, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 1585 days.

(21) Appl. No.: 16/660,803

(22) Filed: Oct. 23, 2019

(65) Prior Publication Data

US 2021/0121784 A1 Apr. 29, 2021

(51) Int. Cl.
*A63F 13/79* (2014.01)
*A63F 13/537* (2014.01)
*G06F 3/0484* (2022.01)
*G06Q 30/0241* (2023.01)

(52) U.S. Cl.
CPC ............ *A63F 13/79* (2014.09); *A63F 13/537* (2014.09); *G06Q 30/0276* (2013.01); *G06F 3/0484* (2013.01)

(58) Field of Classification Search
CPC ... A63F 13/79; A63F 13/537; G06Q 30/0276; G06F 3/0484
See application file for complete search history.

(56) References Cited

U.S. PATENT DOCUMENTS

| | | | | |
|---|---|---|---|---|
| 10,908,812 | B2 * | 2/2021 | Cheung | A63F 13/22 |
| 10,912,991 | B2 * | 2/2021 | Buhr | A63F 13/23 |
| 11,395,970 | B2 * | 7/2022 | Hagland | A63F 13/355 |
| 2003/0033600 | A1 * | 2/2003 | Cliff | A61B 5/162 |
| | | | | 725/12 |
| 2003/0044021 | A1 * | 3/2003 | Wilkinson | G09B 19/0015 |
| | | | | 381/56 |
| 2003/0236582 | A1 * | 12/2003 | Zamir | G11B 27/34 |
| 2004/0041787 | A1 * | 3/2004 | Graves | G06F 3/0338 |
| | | | | 345/157 |
| 2006/0246969 | A1 * | 11/2006 | Penello, Jr. | G11B 17/056 |
| | | | | 463/1 |
| 2007/0159466 | A1 * | 7/2007 | Kawell | G06F 1/1662 |
| | | | | 345/169 |
| 2007/0190832 | A1 * | 8/2007 | Totsuka | H01R 35/04 |
| | | | | 439/157 |
| 2008/0032800 | A1 * | 2/2008 | Liu | G07F 17/3293 |
| | | | | 463/42 |
| 2011/0136568 | A1 * | 6/2011 | Buhr | A63F 13/22 |
| | | | | 463/37 |
| 2012/0026408 | A1 * | 2/2012 | Lee | H04N 21/42222 |
| | | | | 348/734 |
| 2012/0064820 | A1 * | 3/2012 | Bemmel | H04L 65/611 |
| | | | | 455/3.06 |
| 2012/0090446 | A1 * | 4/2012 | Moreno | G09B 15/00 |
| | | | | 84/470 R |
| 2012/0311034 | A1 * | 12/2012 | Goldband | G06Q 50/01 |
| | | | | 709/204 |
| 2014/0089238 | A1 * | 3/2014 | Saito | G06F 3/01 |
| | | | | 706/12 |

(Continued)

*Primary Examiner* — Ankit B Doshi

(74) *Attorney, Agent, or Firm* — Kilpatrick Townsend & Stockton LLP

(57) ABSTRACT

A "like" button is provided on a computer simulation controller to make it convenient for a player of a computer simulation to register a "like", which can be monetized.

6 Claims, 5 Drawing Sheets

(56)                    References Cited

U.S. PATENT DOCUMENTS

| | | | | |
|---|---|---|---|---|
| 2014/0325552 A1* | 10/2014 | Evans | G06F 16/9558 | |
| | | | 725/28 | |
| 2014/0337546 A1* | 11/2014 | Kitahama | B60K 37/06 | |
| | | | 710/73 | |
| 2014/0349261 A1* | 11/2014 | Dennis | G09B 5/02 | |
| | | | 434/236 | |
| 2015/0005064 A1* | 1/2015 | Lee | A63F 13/87 | |
| | | | 463/31 | |
| 2015/0031452 A1* | 1/2015 | Rundell | A63F 13/23 | |
| | | | 463/31 | |
| 2015/0049253 A1* | 2/2015 | Persson | H04L 67/306 | |
| | | | 348/734 | |
| 2015/0262314 A1* | 9/2015 | Roberts | G06Q 20/384 | |
| | | | 705/319 | |
| 2016/0030835 A1* | 2/2016 | Argiro | A63F 13/428 | |
| | | | 463/31 | |
| 2016/0077686 A1* | 3/2016 | Cosío | H04N 21/4821 | |
| | | | 715/825 | |
| 2016/0310852 A1* | 10/2016 | Liao | A63F 13/86 | |
| 2016/0361635 A1* | 12/2016 | Schmitz | A63F 13/22 | |
| 2017/0094442 A1* | 3/2017 | Park | H04W 4/20 | |
| 2018/0091832 A1* | 3/2018 | Zeiler | G06V 10/82 | |
| 2018/0104583 A1* | 4/2018 | Sato | A63F 13/40 | |
| 2018/0246983 A1* | 8/2018 | Rathod | G06F 16/972 | |
| 2018/0353850 A1* | 12/2018 | Strahle | A63F 13/98 | |
| 2018/0369692 A1* | 12/2018 | Winick | A63F 13/355 | |
| 2019/0124399 A1* | 4/2019 | Kim | H04N 21/4788 | |
| 2019/0171666 A1* | 6/2019 | McKenzie | G06F 16/5866 | |
| 2019/0268668 A1* | 8/2019 | Moskovchenko | | |
| | | | H04N 21/2187 | |
| 2019/0391716 A1* | 12/2019 | Badr | G06F 3/167 | |
| 2021/0342030 A1* | 11/2021 | Shinohara | G02B 5/04 | |
| 2022/0370894 A1* | 11/2022 | Fahmie | A63F 13/24 | |

* cited by examiner

600

602

LIST OF GAME BY PLAYER "LIKES"

604 — GAME          606 — #LIKES

A                    10K +
B                    8,540
•                    •
•                    •
•                    •
Z                    3

700 — PROVIDE "LIKES", USER INFO

702 — RECEIVE TAILORED ADS

704 — PROVIDE TO USER(S)

LIKE BUTTON

FIELD

The application relates generally to technically inventive, non-routine solutions that are necessarily rooted in computer technology and that produce concrete technical improvements.

BACKGROUND

Increasingly, computer simulations such as computer games are acquiring attributes of other physical and computer activities, including the perceived need to allow players and spectators of computer games to indicate whether they "like" a particular game. Present principles seek to promote input of "likes" from spectators, as such are useful indicia of what makes a successful product.

SUMMARY

Accordingly, a system includes at least one computer simulation controller and at least one computer simulation source configured to receive input from the computer simulation controller to control presentation of a computer simulation presented on at least one display. The computer simulation source includes at least one processor and at least one storage accessible to the processor with instructions executable by the processor to receive input generated by a "like" button on the simulation controller. The instructions are executable to, responsive to the input, present on the display an indication of a "like".

In examples, the computer simulation source can include a network server communicating with the computer simulation controller over a computer network. The computer simulation source can include a computer game console communicating directly with the computer simulation controller. The indication of input of a "like" can include a like meter.

In non-limiting examples, the instructions are executable to, responsive to receiving the input, identify a user associated with the simulation controller. In such embodiments the instructions can be executable to provide information regarding the input and the user to a server associated with advertising.

In some implementations the "like" button has no other function apart from registering a like. In other implementations the "like" button has at least one other function for controlling the computer simulation in addition to registering a like.

In another aspect, a method includes receiving a signal from a simulation controller generated by a player of a computer simulation being controlled by the controller and indicating that the player likes the simulation. The method also includes providing an indication of the signal, the simulation, and identifying information to a server.

In examples of the method aspect, the server can be associated with at least one advertisement generation concern, and/or the server can be the source of the computer simulation. The method may include presenting an indication of the signal on a display presenting the computer simulation. The indication may include text, at least one graphic, at least one list of computer simulations, and combinations thereof.

In another aspect, an apparatus includes at least one computer storage that is not a transitory signal and that in turn instructions executable by at least one processor to generate a signal responsive to a like button on a simulation controller being manipulated during play of a computer simulation. The signal has no simulation control function.

The details of the present application, both as to its structure and operation, can best be understood in reference to the accompanying drawings, in which like reference numerals refer to like parts, and in which:

DETAILED DESCRIPTION

Figure 1:
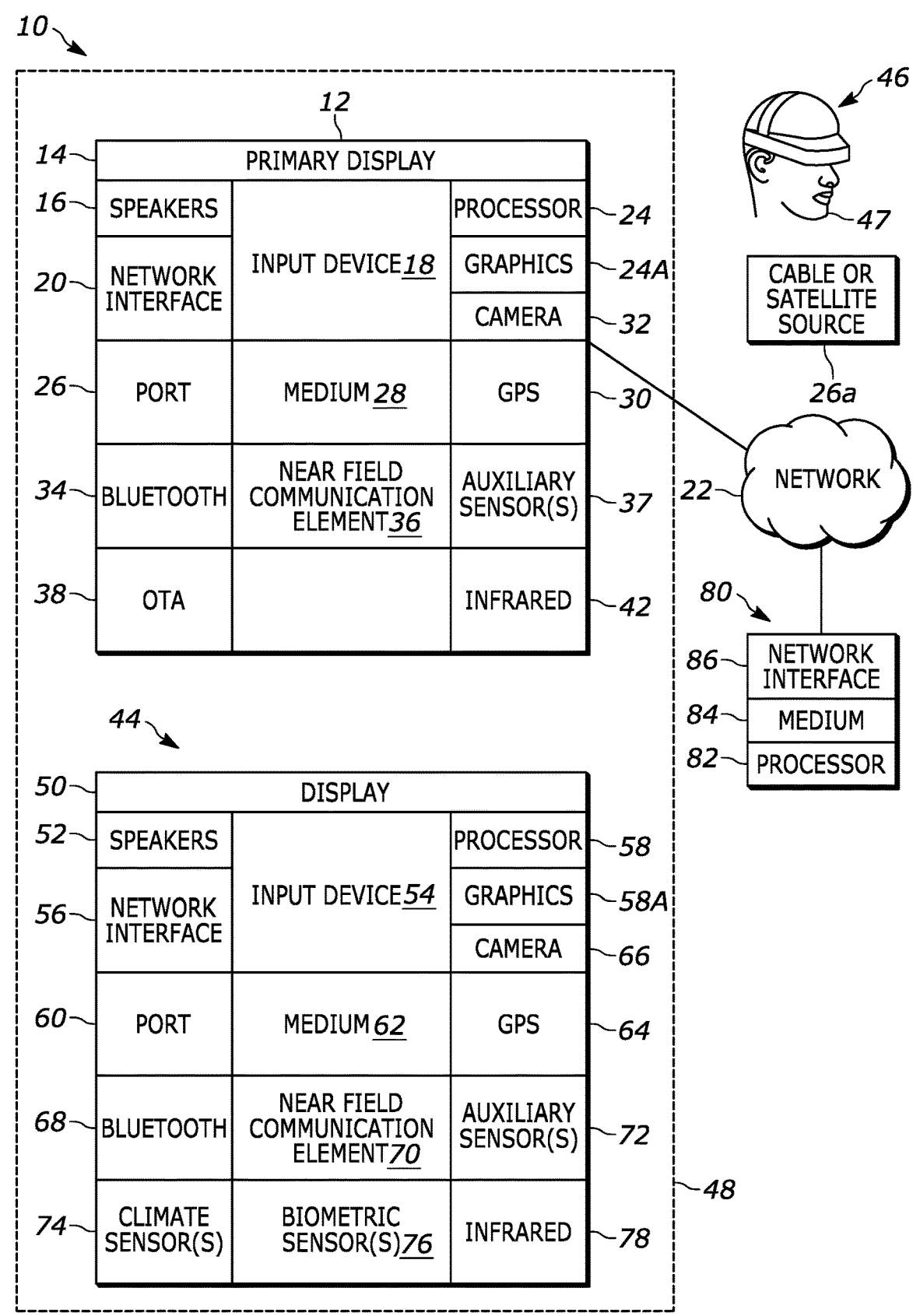
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/ microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
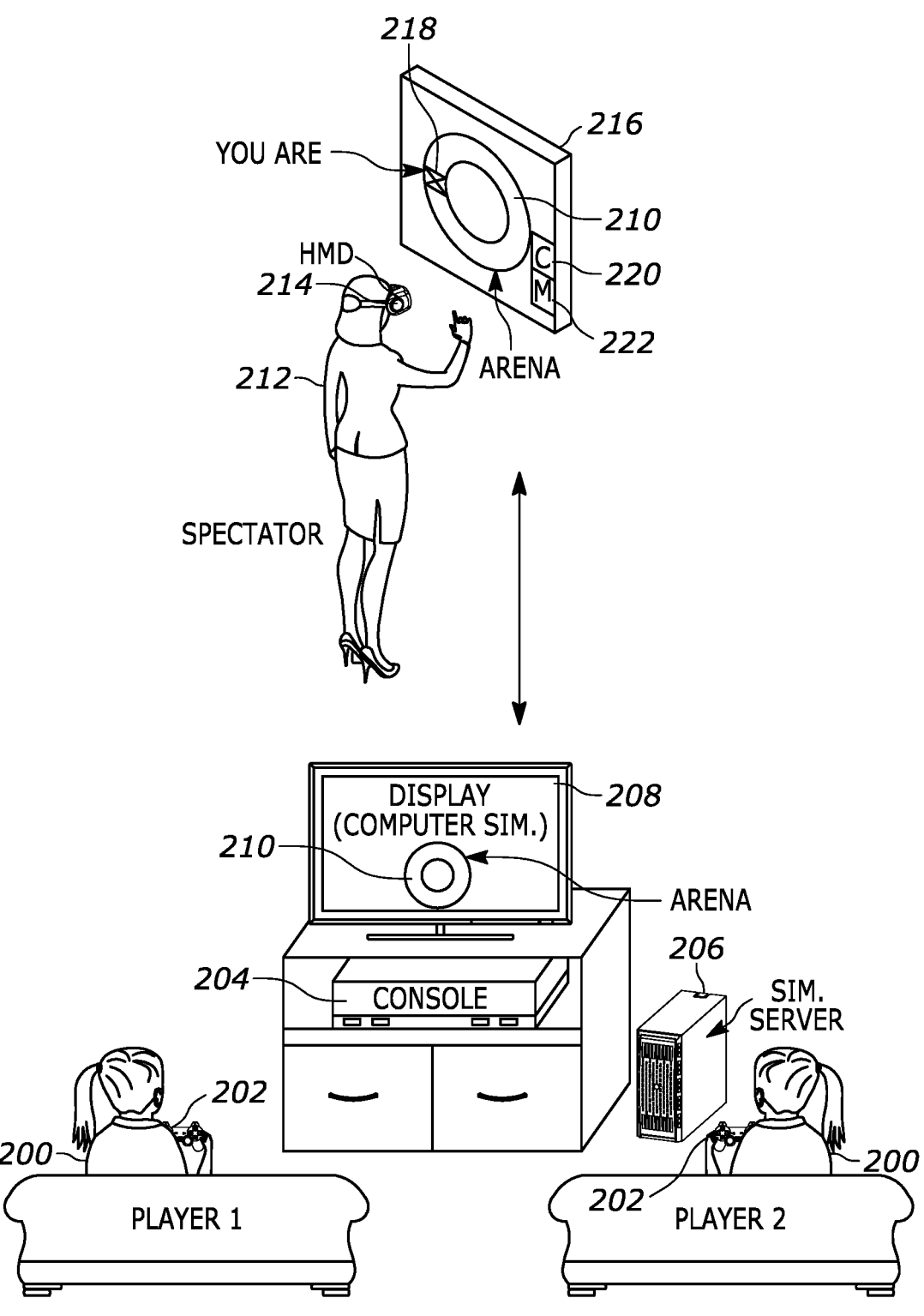
FIG. 2 schematically illustrates a computer simulation/e-sports spectator watching a computer simulation being played by others.

Now referring to FIG. 2, two (or more) computer simulation players 200 are shown playing a computer simulation such as but not limited to a computer game or e-sport by manipulating respective simulation controllers 202 to control a simulation sourced by a simulation console 204 and/or Internet server 206 for audio-video display of the simulation on one or more displays 208. In the example shown, a virtual arena 210 is shown as part of the simulation being presented on the display 208.

Additionally, one or more spectators 212 (only a single spectator shown for clarity) may observe the simulation being presented on the display 208 without being a player of the simulation. The spectator 212 may observe the simulation because the simulation can be provided to a display associated with the spectator, such as a virtual reality (VR) head-mounted display (HMD) 214 and/or a display 216 of a computing device such as a tablet computer, smart phone, etc. The HMD 214 and/or display 216 may include cameras to image the face of the spectator 212 to provide information both for gaze tracking and emotional state of the spectator 212.

In the example shown, the virtual arena 210 is presented on the display 216 along with an indication 218 of where in the virtual arena 210 the spectator 212 is emulated to be located. The device hosting the display 216 may include any of the appropriate components discussed above in relation to FIG. 1, including a camera or other imaging device 220 and a microphone 222.

Figure 3:
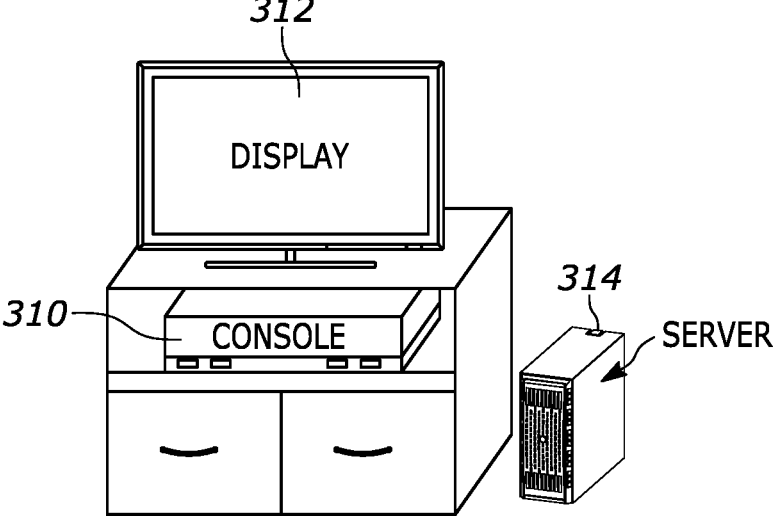
FIG. 3 is a schematic diagram of an example simulation controller in one intended environment.
Figure 3:
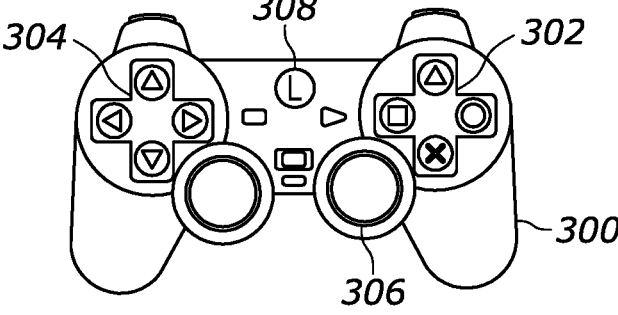

Turning to FIG. 3, a computer simulation 300 is shown consistent with present principles. While simulation controllers may have several configurations, the example controller 300 shown includes, on a plastic hand-holdable housing, four function buttons 302 arranged in a cruciform shape that may be labeled with a circle, a triangle, and "X", and a square. The controller also may include up, down, left, and right navigational buttons 304 and left and right stick buttons 306.

Any one or more of the buttons 302-306 may establish a "like" button. For example, the right stick button 306 may be accorded the "like" function described below, in addition to or in lieu of its game control function, when, for instance, the user interface (UI) shown in FIG. 5 and described further below appears onscreen, and when the UI is not onscreen the stick button 306 may resume its normal game control function. Or, a combination of buttons 302-306 when depressed simultaneously may together generate a "like" signal and hence establish a "like" button.

However, in the embodiment shown the controller 300 includes a single-function like button 308 which has no function other than generating a signal that is interpreted to be a "like" signal. The simulation controller 300 sends signals to a simulation console 310 for control of a simulation being presented on a display 312. The simulation controller 300 may also send signals to a network server 314 sourcing the simulation in addition to or in lieu of sending signals to the console 310 for control of the simulation being presented on a display 312.

However, the single function like button could be extended with various ways this button could be pressed. A quick double press of the button could be interpreted as a "dislike" or otherwise a cancellation of the "like". A quick triple press or a long press of a button would present a UI where users can choose more expanded choice of reactions related to the simulation or game play, such as "cool", "awesome", "angry", "frightening", "hilarious", "confusing", "sickening", "weeping", "joyful", "loving", "hate", "lust".

Figure 4:
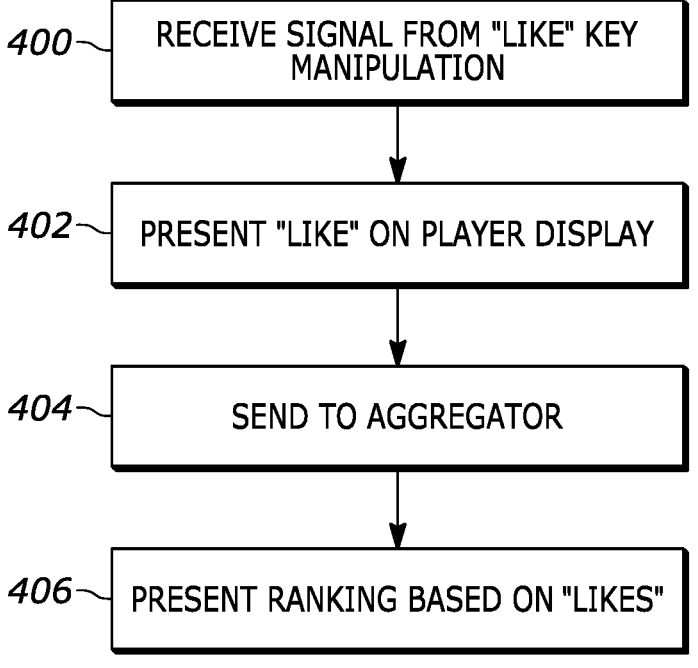
FIG. 4 is a flow chart of example logic consistent with present principles.

FIG. 4 shows logic attendant to the controller 300 shown in FIG. 3. Commencing at block 400, a signal is received from manipulation of the like button. Moving to block 402, a "like" UI may be presented on the display presenting the simulation being controlled by the controller 300. Also, at block 404 the "like" signal and if desired an identifier associated with a user associated with the simulation controller (e.g., a network address of the simulation console or a name of a purchaser of the console or controller) to an aggregator such as an advertisement server, in some cases via the network server 314 shown in FIG. 3. If desired, an indication such as but not limited to a ranking of computer simulations by number of "likes" may be presented.

Figure 5:
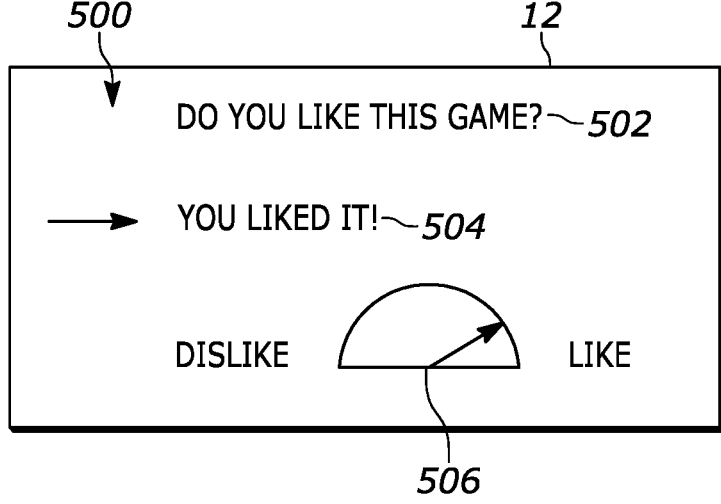
FIGS. 5 and 6 are screen shots of example user interfaces (UI) consistent with present principle.
Figure 6:
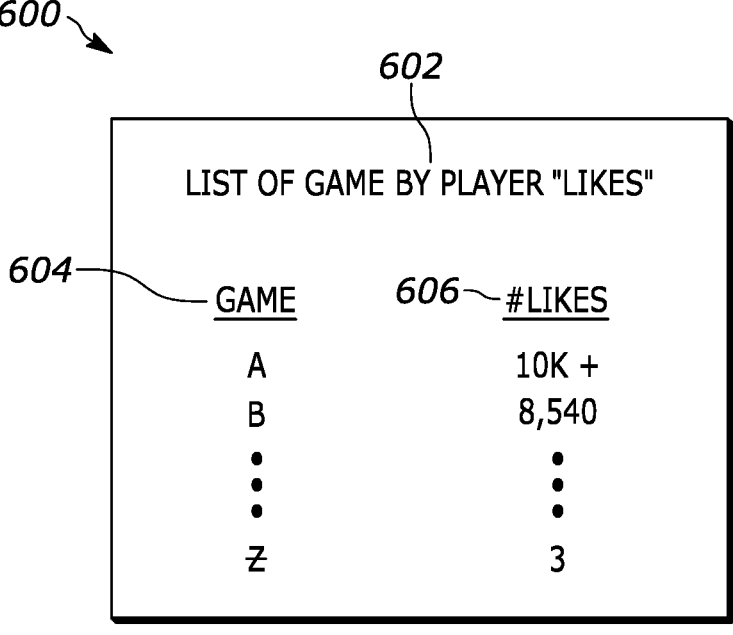

FIGS. 5 and 6 illustrate further. In FIG. 5, a UI 500 is presented on a display such as the display 12 shown in FIG. 1 that also presents the simulation being controlled by the controller 300 of FIG. 3. The UI 500 may include a prompt 502 to the player to indicate whether the player likes the simulation being presented on the display 12. Responsive to the player pressing the like button, a message 504 may appear acknowledging that the player liked the simulation.

In addition to or in lieu of the message 504, a "like" meter 506 in the form of a semi-circle may be presented. In the non-limiting example shown, the like meter 506 indicates "dislike" at the left portion of the meter and "like" at the right portion, with an arrow pointing to the "like" portion of the meter responsive to the player manipulating the like button of the controller.

The UI for the expanded choice of reactions could be presented as a vertical or horizontal or a multiline list where you could use the cursor to choose. Or otherwise, could be presented as a radial menu where choice can be made with a directional move on the controller. Voice control could be incorporated to choose the item within the list.

FIG. 6 illustrates a UI 600 that may be presented to any one of player of the computer simulation or a spectator of the computer simulation who views the computer simulation on a separate spectator device without the capability to control the simulation. The UI 600 may indicate at 602 that it is showing a list of computer simulation titles 604 with respective corresponding number of player "likes" 606, from most liked to least liked.

Figure 7:
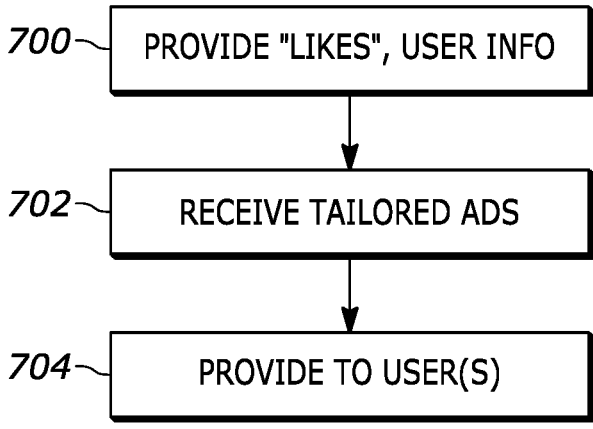
FIG. 7 is a flow chart of example monetization logic consistent with present principles.

FIG. 7 illustrates further details of monetizing "like" indications input by means of simulation controllers such as the controller 300 in FIG. 3. Commencing at block 700, the "like" indications along with the name of the relevant simulation and user information mentioned above may be provided to an aggregator server. This provisioning may be done for pecuniary gain. In response, advertisements tailored to the particular user may be received at block 702 and provided to the user's system for presentation on the user's display at block 704. Advertised products may include other simulations, apparel related to characters in the simulation that was liked, etc. It should be appreciated that a "dislike" button may be provided on a simulation controller in lieu of or in addition to the "like" pattern to function in the obverse of the "like" button to register dislike of a simulation.

It will be appreciated that whilst present principals have been described with reference to some example embodiments, these are not intended to be limiting, and that various alternative arrangements may be used to implement the subject matter claimed herein.

What is claimed is:

1. A system comprising:

at least one physical computer simulation controller with a dedicated "like" button;

at least one computer simulation source configured to receive input from the physical computer simulation controller to control presentation of a computer simulation presented on at least one display, the computer simulation source comprising at least one processor and at least one storage accessible to the processor and comprising instructions executable by the processor to:

receive input generated by the "like" button on the physical simulation controller; and responsive to the input, present on the display an indication of a "like";

wherein the "like" button has at least one other function for controlling the computer simulation in addition to registering a like.

2. The system of claim 1, wherein the computer simulation source comprises a network server communicating with the physical computer simulation controller over a computer network.

3. The system of claim 1, wherein the computer simulation source comprises a computer game console communicating directly with the physical computer simulation controller.

4. The system of claim 1, wherein the indication comprises an arcuate like meter.

5. The system of claim 1, wherein the instructions are executable to: responsive to receiving the input, identify a user associated with the physical simulation controller.

6. The system of claim 5, wherein the instructions are executable to: provide information regarding the input and the user to a server associated with advertising.

* * * * *